(12) United States Patent
Koller

(10) Patent No.: US 6,471,454 B1
(45) Date of Patent: Oct. 29, 2002

(54) DEVICE FOR PROVISIONALLY CONNECTING A FASTENING STRAP TO AN ANCHOR POINT

(75) Inventor: Karl Koller, Stein am Rhein (CH)

(73) Assignee: Ancra Jungfalk GmbH, Engen (DE)

( * ) Notice: Subject to any disclaimer, the term of this patent is extended or adjusted under 35 U.S.C. 154(b) by 0 days.

(21) Appl. No.: 09/402,209
(22) PCT Filed: Apr. 9, 1998
(86) PCT No.: PCT/EP98/02094
  § 371 (c)(1),
  (2), (4) Date: Sep. 30, 1999
(87) PCT Pub. No.: WO98/44887
  PCT Pub. Date: Oct. 15, 1998

(30) Foreign Application Priority Data

| Apr. 9, 1997 | (DE) | 297 06 258 U |
| Nov. 21, 1997 | (DE) | 197 52 256 |

(51) Int. Cl.⁷ ............................................. B60P 7/08
(52) U.S. Cl. ..................... 410/7; 410/105; 410/8; 410/12; 410/104
(58) Field of Search ....................... 410/4, 7, 8, 10, 410/11, 12, 23, 104, 105, 110, 116; 248/499, 503.1; 296/65.04; 297/DIG. 4; 280/304.1

(56) References Cited

U.S. PATENT DOCUMENTS

| 3,367,000 A | 2/1968 | Schluter |
| 3,709,156 A | 1/1973 | Bowers |
| 3,765,637 A | 10/1973 | Watts |
| 3,831,532 A | 8/1974 | Smith et al. |
| 4,671,713 A | * 6/1987 | Lenkham ........................ 410/7 |
| 4,688,843 A | * 8/1987 | Hall ............................ 410/8 X |
| 4,886,403 A | * 12/1989 | Gresham ....................... 410/10 |
| 4,966,392 A | 10/1990 | Featon et al. |
| 4,995,775 A | * 2/1991 | Gresham ....................... 410/10 |
| 5,026,225 A | * 6/1991 | McIntyre ...................... 410/23 |
| 5,391,030 A | * 2/1995 | Lee ............................. 410/12 |
| 5,823,724 A | * 10/1998 | Lee ............................ 410/104 |
| 5,888,038 A | * 3/1999 | Ditch et al. .................... 410/7 |
| 6,113,325 A | * 9/2000 | Craft ............................. 410/7 |

FOREIGN PATENT DOCUMENTS

| DE | 1890983 | 4/1964 | |
| DE | 2814131 | * 10/1979 | 410/11 |
| FR | 1161214 | 3/1958 | |

OTHER PUBLICATIONS

PCT WO 89/09588.

* cited by examiner

Primary Examiner—Stephen T. Gordon
(74) Attorney, Agent, or Firm—Marshall, Gerstein & Borun

(57) ABSTRACT

The invention relates to a device for provisionally connecting a fastening strap, specially a wheel chair strap, to a fixing rail (12) with a longitudinal groove. A securable and removable locking member of the fastening strap can be inserted into said longitudinal groove. A pivoting point for the fastening strap is arranged above a connecting member which can be anchored in the fixing rail (12) adjacent to the latter. A ball-and-socket joint (51) can be mounted on the connecting member. The joint can be connected to the connecting member and the fastening strap.

15 Claims, 5 Drawing Sheets

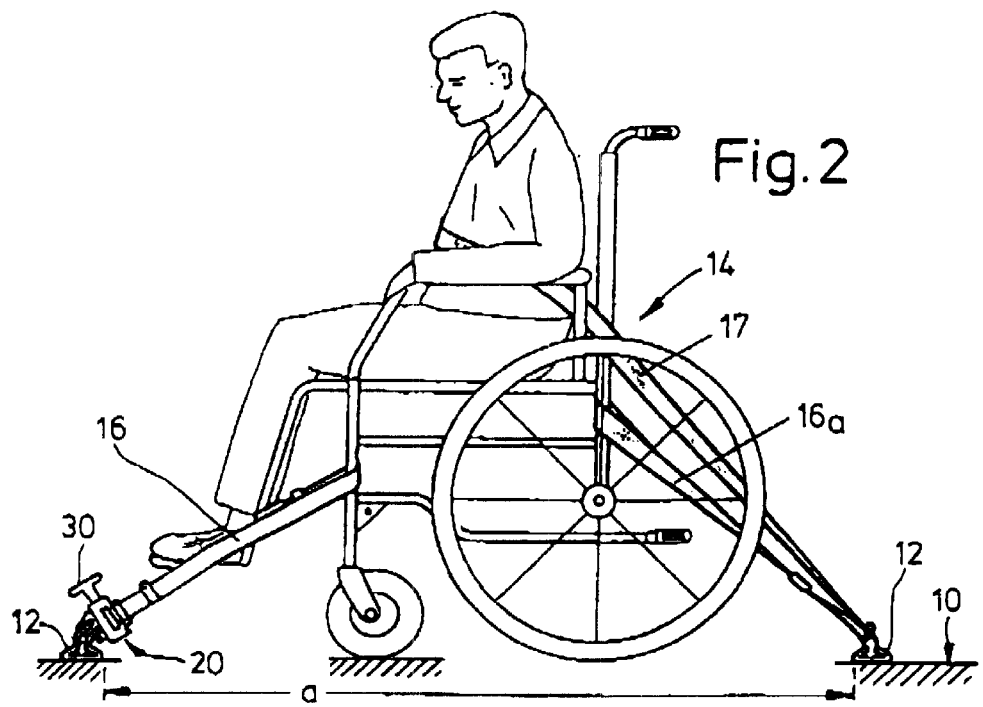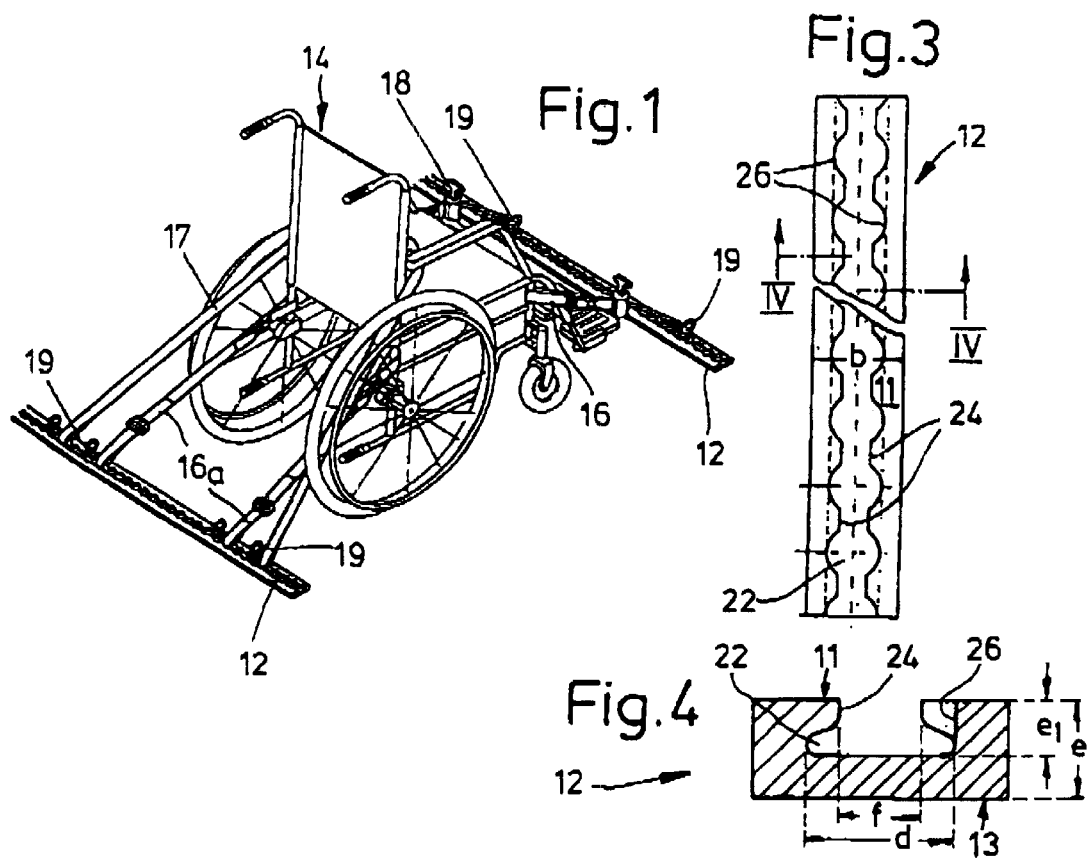

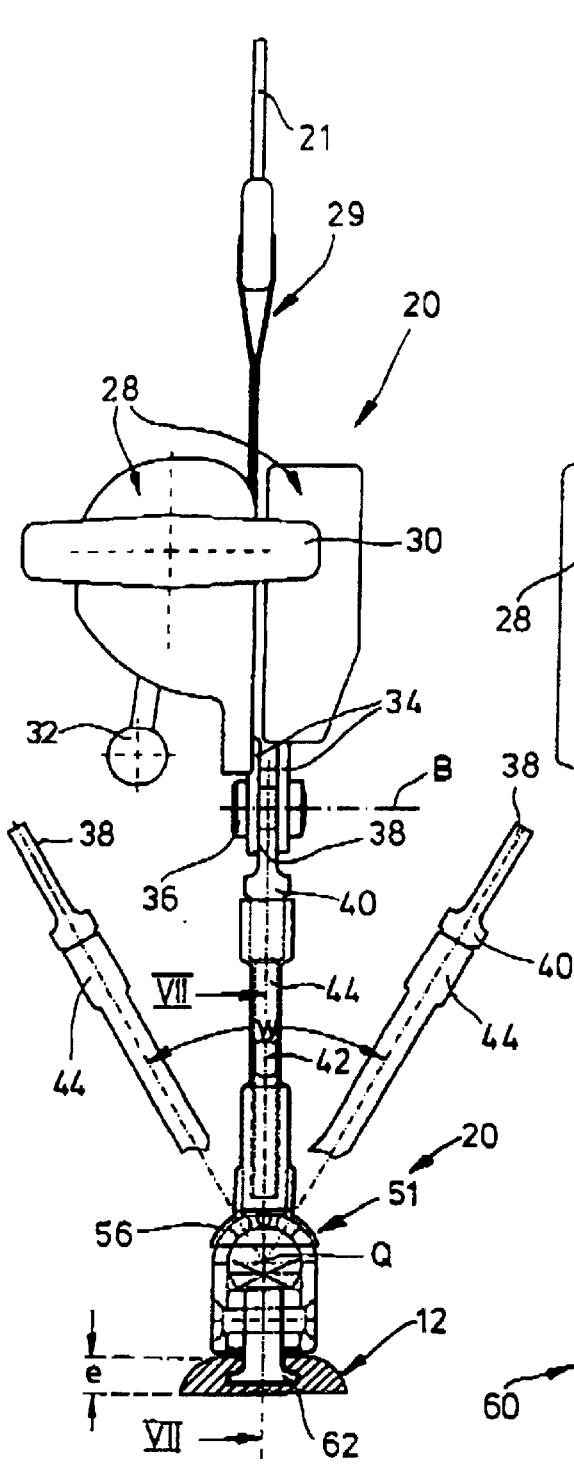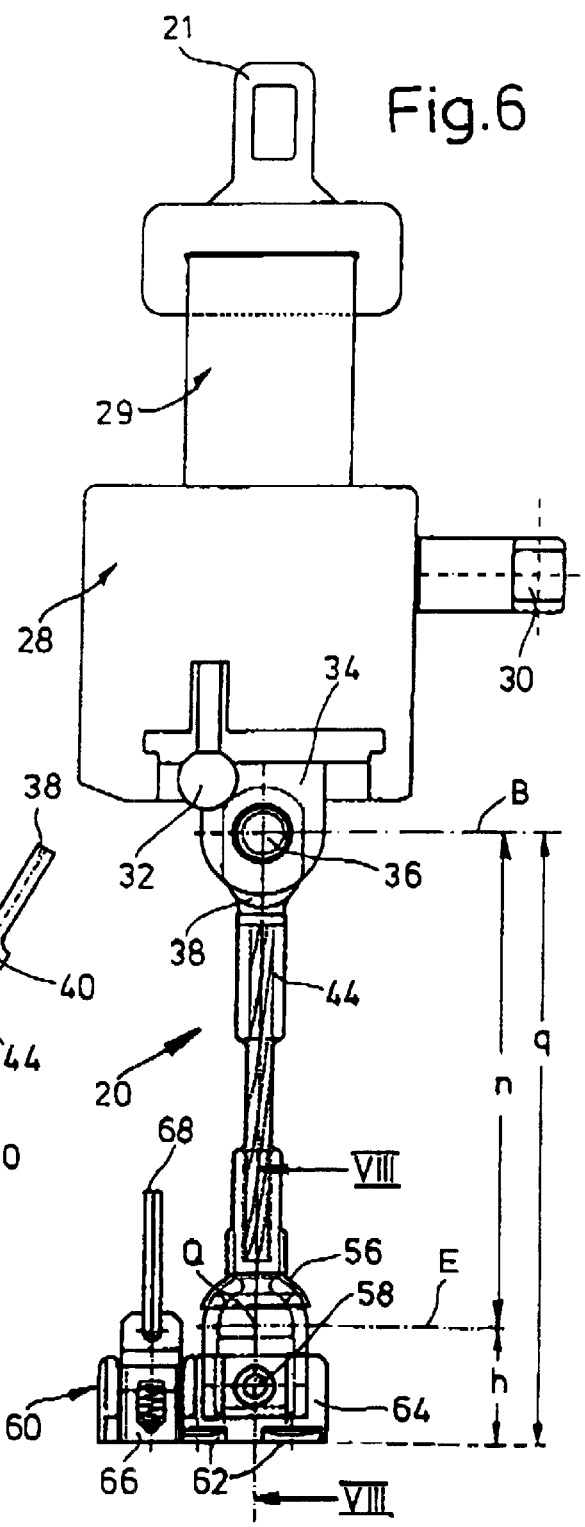

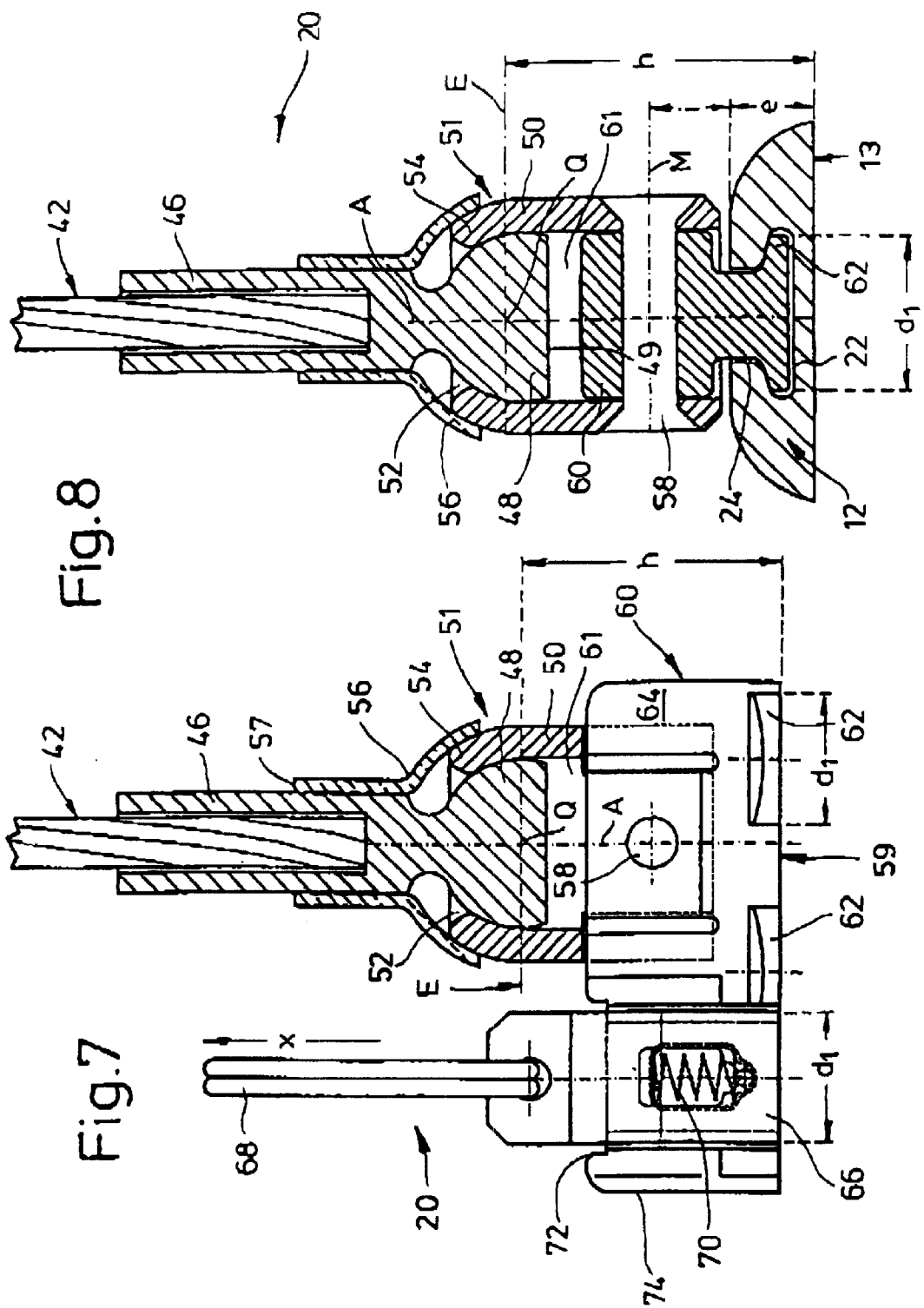

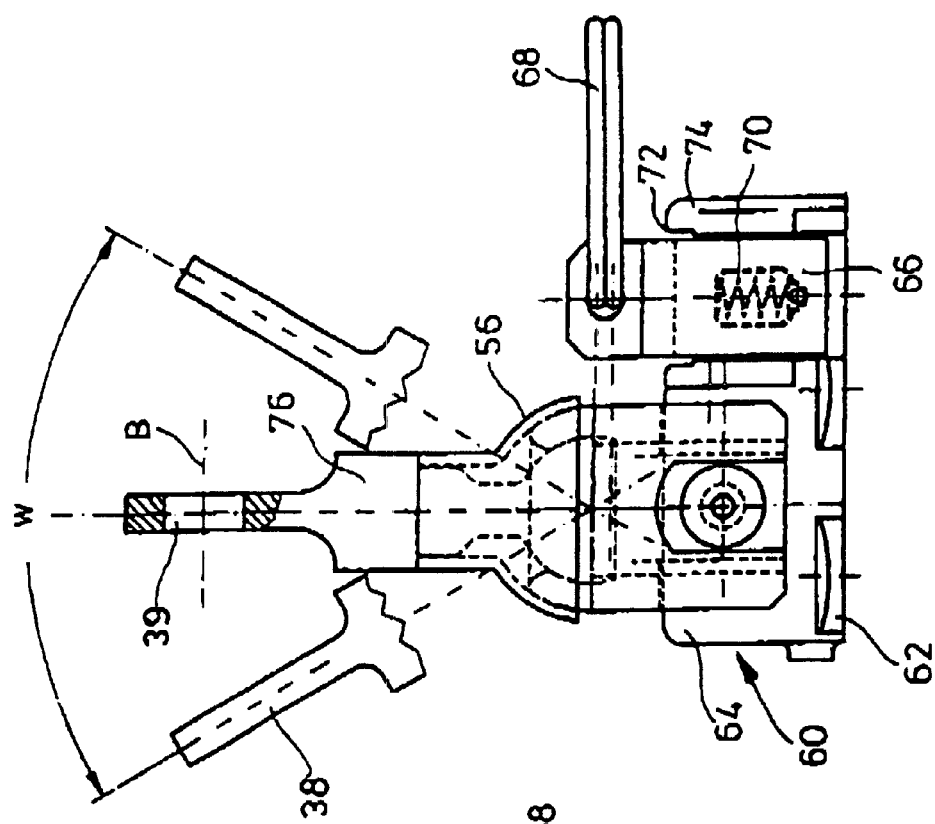
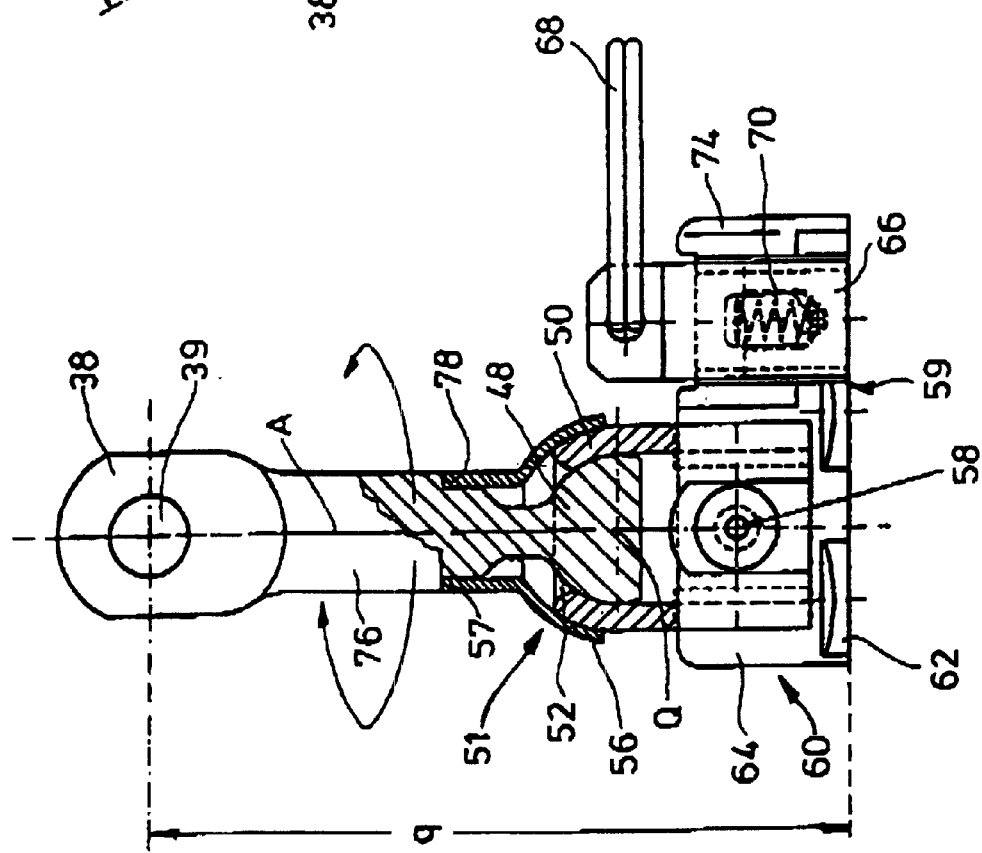
Fig.11
Fig.12

DEVICE FOR PROVISIONALLY CONNECTING A FASTENING STRAP TO AN ANCHOR POINT

BACKGROUND

1. Field of the Invention

The invention concerns a device for temporarily connecting a fastening strap—in particular a strap on a wheelchair—to an anchor point.

2. Description of the Prior Art

Various configurations of carriage or wagon body structures suitable for wheelchairs are known, in which the wheelchair—which is introduced by way of access ramps or rails—is secured with fastening or lashing straps to point anchorages or in hold rails. The fastening straps in that respect are provided adjacent the wheelchair with so-called retractors which are connected to the retaining bodies by way of comparatively long cable lines. It has been found that this entails the disadvantage that the cable lines connected to the excessively heavy retractors, due to being frequently turned, become undesirably twisted and become easily breakable.

FR-A-1161214 discloses a fixing pairing comprising a channel-like holding rail with laterally protruding channel edges and pairs of slots formed therein for a transverse plate which is displaceable thereon and whose side regions which are curved downwardly in cross-section embrace the channel edges in holding relationship with play. Held on the transverse plate is a longitudinal plate which is movable relative thereto and which is of U-shaped longitudinal section and which can engage with its free limbs into the pairs of slots. Passing through both plates is a substantially concentric pin which is embraced by a coil spring that bears against the longitudinal plate, while an eye is pivotably connected to the pin.

In accordance with U.S. Pat. No. 3,765,637 lateral pin portions which are disposed on a common axis, of an eye plate which is mounted rotatably by same engage on both sides in openings of a cap which is rotatably supported on a thrust body of a holding rail. The thrust body engages with plate-like shaped portions provided on both sides into the longitudinal groove in a holding rail, the shaped portions engaging in a retaining position under regions of the holding rail, which are of an undercut configuration.

Finally it is known per se from WO-A 9809588 for a coupling element for a fastening strap of a wheelchair to be associated with a tightening housing.

Therefore the object of the present invention is to improve the connection of a wheelchair to an anchor point or a holding rail; in particular the invention seeks to ensure non-twistability and long service lives.

SUMMARY OF THE INVENTION

In accordance with the invention, the pivot point for the fastening strap, which is above the connecting body that can be anchored in the holding rail and adjacent to the connecting body is arranged at a very short spacing relative to the holding rail; a ball joint which is arranged on the connecting body and which has the pivot point is connected on the one hand to the connecting body and on the other hand to the fastening strap. In addition the ball joint is to have a mounting ball portion which is towards the strap and which is rotatable in a mounting casing of the connecting body.

In accordance with a further preferred feature of the invention, the substantially cylindrical mounting casing of the ball joint, in which the mounting ball portion associated with the fastening strap is rotatably disposed projects up from the connecting body; the edge of the mounting casing which is arranged at the mounting ball portion and which surrounds the mouth opening of the mounting casing is also to be curved inwardly in cross-section in order to engage over the mounting ball portion in holding relationship.

In a device with a cable line extending between the fastening strap and the holding rail, in accordance with an embodiment of the invention formed on the mounting ball portion is a connecting sleeve for a short tensile cable portion which at the other end is connected to a tightening or tensioning housing or to a pivot member. This tensile cable portion which is preferably protected by a casing member terminates at the tightening housing in a sleeve-like shaped portion on a mounting plate and is connected with same by an axis pin to mounting bars of the tightening housing; the mounting plate and the mounting bars are advantageously rigidly connected by the axis pin.

To enhance the safeguard against twisting in addition the spacing between the axis pin and the mounting ball portion should correspond to approximately four times the spacing of the plane of rotation of the mounting ball portion from the underneath surface of the connected holding rail, which in turn approximately corresponds to four times the height of the connected holding rail which preferably measures about 10 mm. The spacings are therefore in the region of a few centimeters.

It has also proven to be advantageous for the unit consisting of the mounting ball portion and the connecting sleeve to be provided with a protective collar or muff which fits with a portion that enlarges towards the end of the edge of the mounting casing and covers over—in protecting relationship therewith—the casing mouth opening which accommodates the mounting ball portion.

The invention provides that at the end mounted movably on the connecting body which is connected to the mounting sleeve by a rivet pin is a locking pin which is connected to the mounting sleeve by a rivet pin is a locking pin which can be withdrawn from a retaining opening in the holding rail against a force-storage device. The locking pin is securely guided at a right angle to the holding rail in a nose portion formed on the connecting portion.

The following advantages in particular are enjoyed in comparison with known lashing systems for wheelchairs:
a pivot point at a lower level, combined with minimum lever forces which are applied to the floor anchorage;
uniform application of force to the connecting body by way of the mounting casing of the ball joint in different lashing positions for the wheelchair in the transportation means;
advantageous rotatability and pivotability by way of the ball joint, the short tensile cable portion is protected in the best possible fashion from loadings such as torsion and bending;
the mounting casing is accommodated in positively locking relationship in the connecting body; and
the ball joint is protected from fouling by the cuff or collar or a plastic cap.

The device according to the invention may also be used to advantage in connection with other loads requiring lashing.

Further advantages, features and details of the invention will be apparent from the description hereinafter of preferred embodiments and with reference to the drawings:

BRIEF DESCRIPTION OF THE DRAWINGS

FIG. 1 is a perspective view of a wheelchair which is connected by lashing elements to lateral holding rails of a loading surface.

FIG. 2 is a side view of a wheelchair with a retaining system according to the invention.

FIG. 3 is a plan view of a holding rail from FIG. 2.

FIG. 4 is a view on an enlarged scale in cross-section through the holding rail of FIG. 3 taken along line IV—IV therein.

FIG. 5 is a side view of a lashing element on an enlarged scale in comparison with FIG. 2.

FIG. 6 is a front view of the lashing element with tightening housing.

FIG. 7 is a view in section on an enlarged scale through a coupling unit which can be seen in FIGS. 5 and 6.

FIG. 8 is a view on an enlarged scale through FIG. 6 taken along line VIII—VIII therein.

FIGS. 11 and 12 are views on an enlarged scale of the coupling unit of FIGS. 9 and 10 in different positions.

DETAILED DESCRIPTION OF THE PREFERRED EMBODIMENT

Figures 9, 10:
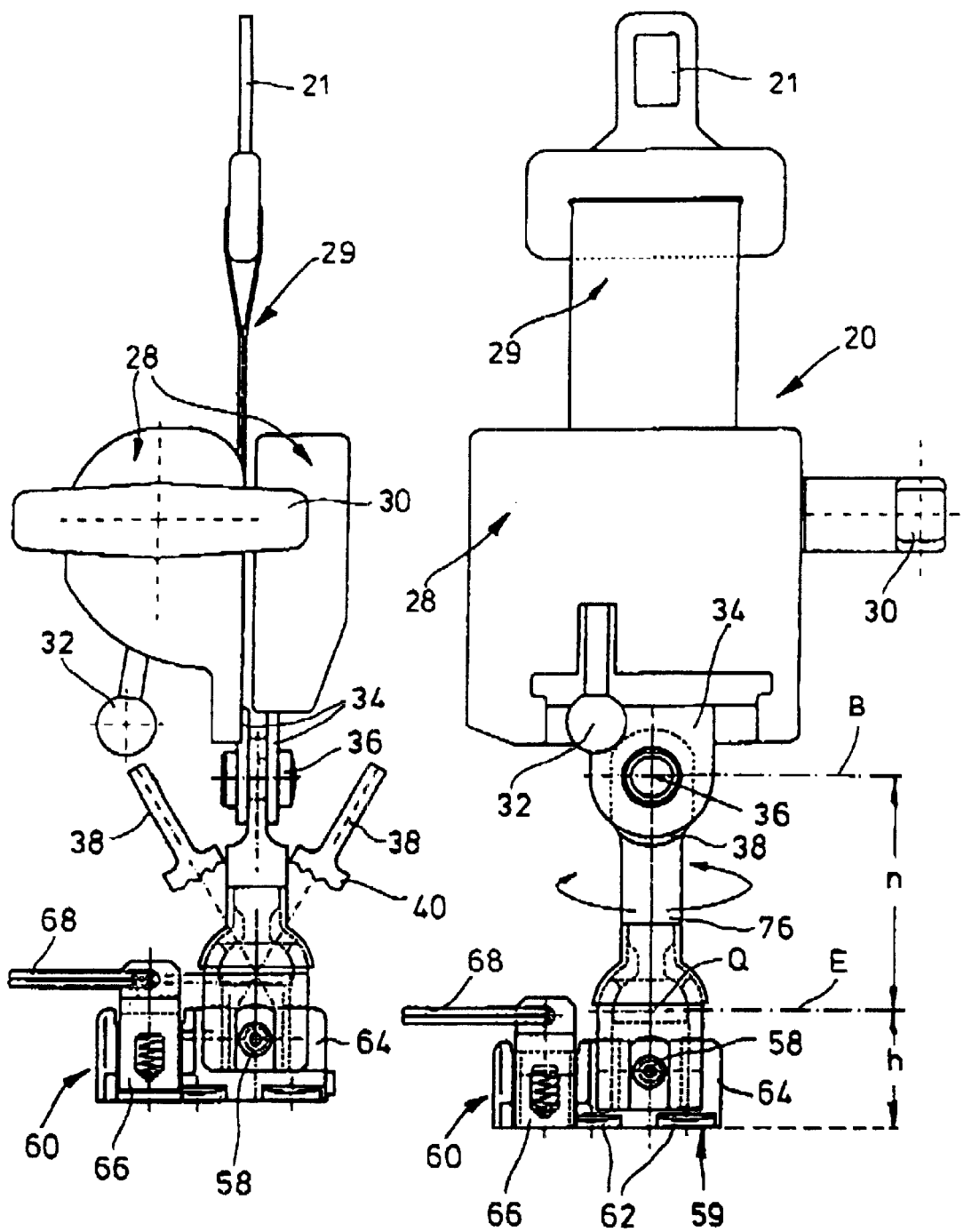
FIG. 9 is a side view on an enlarged scale in comparison with FIG. 2 of a lashing element with coupling unit.
FIG. 10 is a front view of a tightening housing.

Fitted on to the loading surface 10 of a transportation vehicle which is not shown in further detail at a spacing a from each other are parallel holding rails 12—of a width b of for example 34 mm with a height e of about 12 mm—, being mounted by means of their lower mounting surface 13, for the purposes of temporarily fixing a wheelchair 14 by means of two front straps 16 and two rear tightening straps $16_a$—with associated lap belt 17 thereabove. For tightening and loosening the front strap 16, mounted thereto in FIG. 1 at a spacing relative to the holding rail 12 is a so-called retractor 18 connected by a relatively long cable to a retaining body 19 which sits in one of the holding rails 12.

In the embodiment shown in FIGS. 2 through 8 the straps 16, $16_a$, 17 are releasably fixed in the holding rail 12 by means of fittings or turnbuckles 20—connected to the straps at their ends—, by virtue of a longitudinal groove 22 of undercut configuration, of a depth $e_1$ of about 8 mm; in that way the wheelchair 14 is braced in a shake-free manner by the two variable-length pairs of straps 16, $1_{6a}$ as those straps, with the lap strap 17, carry the forces which occur.

The two groove edges 24—which laterally define the slot-like region of the longitudinal groove 22 which is in the rail surface 11—at the spacing f of 12 mm are of a wave-like configuration in FIGS. 3 and 4 by virtue of contours 26 which are part-circular in plan view, the contours 26 being of a diameter d of 22 mm in this case. Holding rails 12 of that kind are used as so-called airline systems, in particular in the form of lashing rails in aircraft.

In particular as shown in FIGS. 5, 6 and 9, 10, the turnbuckle 20 according to the invention—for example as part of the front strap 16—has a tensioning or tightening housing 28 with lateral rotary handle 30 for a tensioning or tightening device (not shown) disposed therein, for the front strap 16, which can be releasably attached to the housing 28 by a coupling tongue 21 of a belt loop 29. A radial release lever 32 projects from the housing 28 at the front side.

Two parallel mounting bars 34 of the housing 28 are connected by an axis pin 36 to a mounting plate 38 which in turn—in FIGS. 5 through 8—is connected with a sleeve-like shaped portion 40 thereon to a comparatively stiff and short tensile cable portion 42. The end, towards the rail, of the cable portion 42 which is overall surrounded by an enclosing tube 44 and which represents a flexible whip handle-like unit 42/44 is carried—as can be seen from FIGS. 7 and 8—in a connecting sleeve 46 which is formed on a mounting ball portion 48.

The structural center point of the mounting ball portion 48 is identified by Q for the sake of enhanced clarity of the drawing and defines a rotational plane E for a ball joint 51 which comprises the mounting ball portion 48 and a cylindrical mounting casing 50 which accommodates it. For the purposes of determining the position of the mounting ball portion 48, the casing edge 54 which surrounds the mouth opening 52 of the casing is curved inwardly in a part-spherical configuration towards the longitudinal axis A. By virtue of that mounting arrangement the mounting ball portion 48—and therewith the whip handle unit 42/44—is pivotable about the structural center point Q shown in FIG. 5 through a pivot angle w of about 60°. Moreover the spacing n between the structural center point Q and the axis B of the eye hole in the mounting plates 38, through which the pin 36 passes, is here about 90 mm.

The axis pin 36 and the rotational plane E of the mounting ball portion 48 are spaced apart from one another a distance ranging from approximately twice to five times the distance which the rotational plane E is spaced from an underneath surface of the holding rail 12. The distance which the rotational plane E is spaced from the underneath surface of the holding rail 12 is approximately double the height of the holding rail 12. This distance separating the rotational plane E from the underneath surface of the holding rail 12 is preferably about 11 mm. The overall spacing between the axis pin 36 and the underneath surface of the holding rail 12 is in a range from about 60 mm to about 110 mm.

Bearing against the edge 54 is the free end of a protective collar or cuff 56 of flexible material which enlarges in a downward direction and embraces the connecting sleeve 46 and covers the mouth opening 52 of the casing, being defined by the edge 54.

A rivet pin 58 which passes on the one hand through the substantially cylindrical mounting casing 50 and on the other hand through a cuboidal connecting body 60 which can be fitted into the holding rail 12 and which is supported in the mounting casing 50 defines a pin axis M whose spacing i from the holding rail 12 approximately corresponds to the height e thereof. The spacing h of the underneath surface 59 of the connecting body 60 relative to the structural center point Q measures in this case 21 mm.

The connecting body 60 is at a gap spacing 61 relative to the base plane 49 of the mounting ball portion 48 and is provided in its lower region on both sides with two respective plate-like shaped portions 62 which project with regions that are part-circular in plan view from the longitudinal surfaces 64 of the connecting body 60; the diameter $d_1$, of the portions 62—as can be clearly seen from FIG. 8—is slightly shorter than the diameter d of the circular contour 26 of the longitudinal groove 22; two respective adjacent circular contours 26 can receive the two plate-like shaped portions of the connecting body 60; the latter is displaceable after being moved downwardly into the shaped portions 62 in the longitudinal groove 22.

As can be seen from FIGS. 6 and 7, mounted to the connecting body 60 of the turnbuckle 20 is a locking pin 66 of a diameter $d_1$, which co-operates with the holding rail 12 and which in the locking position engages into one of the circular contours 26 of the holding rail 12 and which in the looking position engages into one of the circular contours 26 of the holding rail 12 and is unlocked by pulling on a handle bar 68 in the direction indicated by the arrow x; in that situation the locking pin 66 is lifted axially against the force of a coil spring 70 as a force-storage means out of its retaining mounting which is formed by the circular contour 26 of the holding rail 12, whereupon the shaped portions 62 in turn can be removed from their seats which are then respectively in the narrow regions between two circular contours 26, by being displaced in the longitudinal groove 22. The locking pin 66 has a diametral slot (not shown) which is guided at a fin-like central wall 72 of a nose portion 74 which is formed on the connecting body 60.

In the embodiment shown in FIGS. 9 through 12, instead of a tensile cable portion 42 formed on the mounting wall portion 48 is a neck 76 provided with a shoulder-like annular step 78 against which the upper edge 57 of the collar or cuff 56 bears. The neck 76 blends integrally into the mounting plate 38 which is in the form of an eye; the spacing n of the axis B of the eye hole 39 of the mounting plate 38 relative to the rotational plane E measures 44 mm here and its spacing h relative to the underneath surface 59 of the connecting body 60 is about 21 mm while the pivotal angle w is 70° or 90°. It will be clear that here there is a considerably narrower overall spacing q of 65 mm in respect of the axis B relative to the underneath surface 59, in comparison with an overall spacing q of 110 mm in the embodiment with the cable portion 42.

I claim:

1. A system for temporarily connecting a fastening strap to an anchor point, wherein a pivot point for the fastening strap is arranged above a connecting body lockably and releasably insertable into a holding rail, said pivot point being adjacent to said holding rail, said holding rail having a longitudinal groove of an undercut configuration and said fastening strap being rotatable about the pivot point in a rotary angle and further being pivotable about said pivot point in a pivot angle, wherein a ball joint is arranged on said connecting body, said ball joint having the pivot point and being connected to said connecting body and to said fastening strap, and said connecting body being displaceable along said longitudinal groove.

2. The system of claim 1, wherein said ball joint has a mounting ball portion at a strap side thereof, said mounting ball portion being mounted rotatably in a mounting casing of the connecting body.

3. The system of claim 2, further including a cylindrical mounting casing projecting up from said connecting body, with a casing edge surrounding a casing mouth opening, said cylindrical mounting casing being curved inwardly in cross-section.

4. The system of claim 2, wherein said mounting ball portion of the ball joint is connected to a pivot portion by a tensile cable portion.

5. The system of claim 2, wherein a neck is provided on said mounting ball portion of the ball joint, said neck being integral with a pivot portion at said strap side.

6. The system of claim 2, said pivot point defining a rotating plane and being a structural center point of the mounting ball portion.

7. The system of claim 1, wherein said pivot angle is about 60°.

8. The system of claim 3, wherein said mounting ball portion of the ball joint and a connecting sleeve for the fastening strap form a unit provided with a protective cuff which sits with a portion that enlarges towards a first end on an edge of the mounting casing associated with the connecting body and covers said casing mouth opening which accommodates the mounting ball portion.

9. The system of claim 2, wherein a pivot portion is in the form of a rigid mounting plate of a neck and is connected by an axis pin to mounting bars of a tightening housing for the fastening strap.

10. The system of claim 9, wherein said axis pin and a rotational plane of the mounting ball portion are spaced from one another a distance ranging from approximately twice to five times a spacing of said rotational plane from an underneath surface of the holding rail.

11. The system of claim 10, wherein said spacing of the rotational plane from the underneath surface of the holding rail corresponds to approximately double the height thereof.

12. The system of claim 11, wherein said spacing of the rotational plane from the underneath surface of the holding rail is about 10 mm.

13. The system of claim 10, wherein an overall spacing of said axis pin from said underneath surface is in a range from about 60 mm to about 110 mm.

14. The system of claim 1, wherein at an end of the connecting body is a movably mounted locking pin adapted to be removable against a force of a force-storage means from a retaining opening of the holding rail.

15. The system of claim 4, wherein a tightening housing is provided on the pivot portion and is adapted to be connected to the fastening strap by a coupling element.

* * * * *